United States Patent Office 3,846,180
Patented Nov. 5, 1974

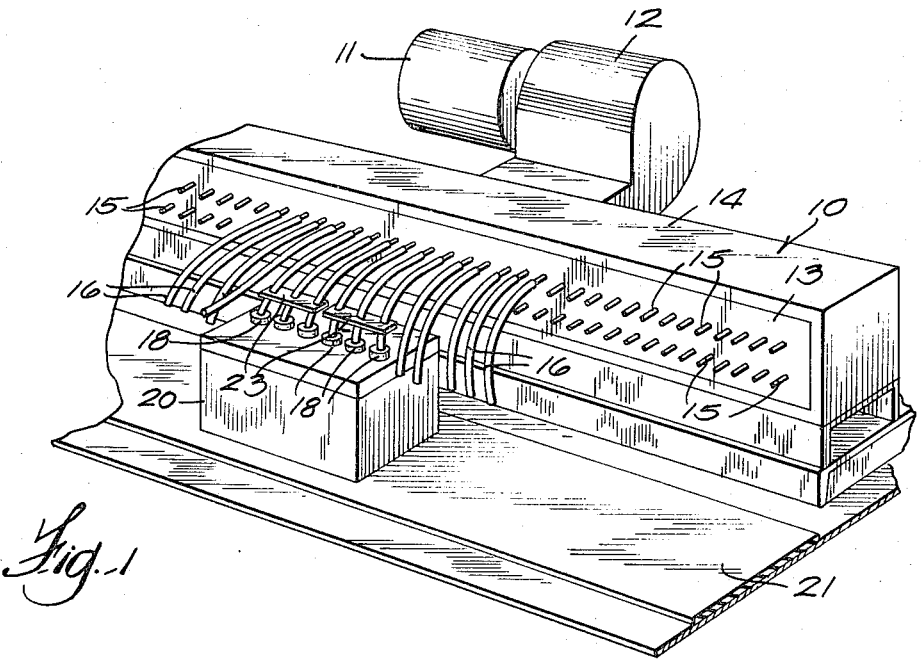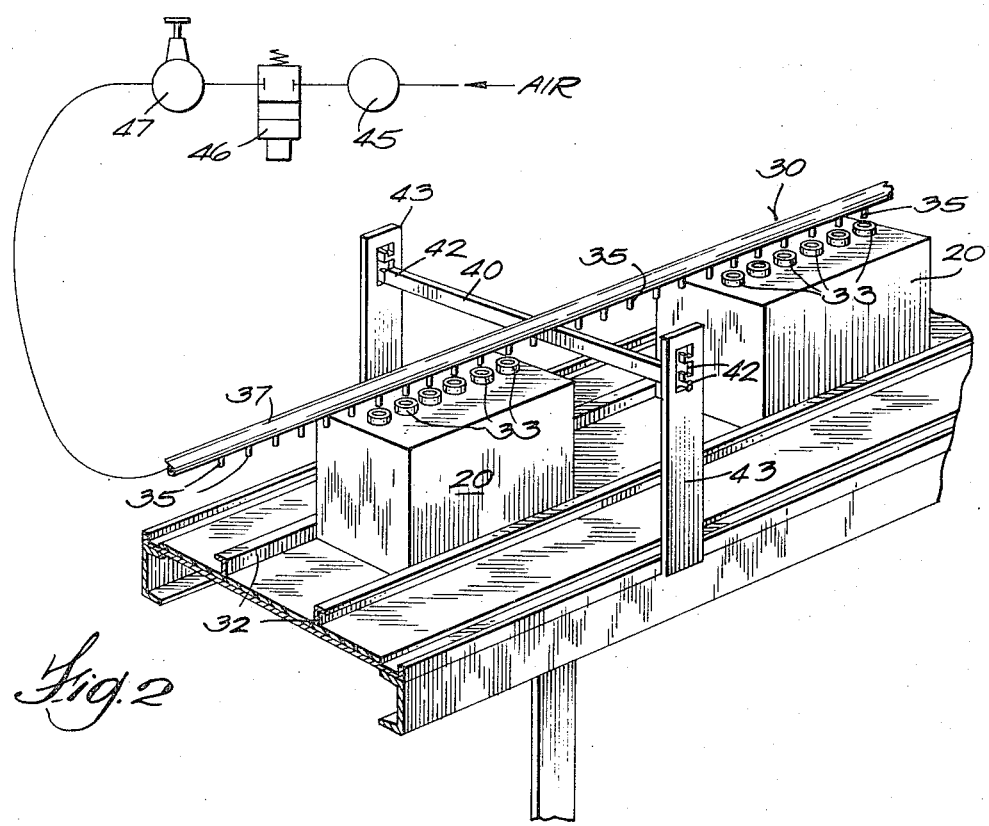

3,846,180
PROCESS FOR REDUCTION OF PRESSURE BUILD-UP IN BATTERIES
Warren Ladd Towle, Milwaukee, Edward Norman Mrotek, Greendale, and Robert Roland Wiethaup, Milwaukee, Wis., assignors to Globe-Union Inc., Milwaukee, Wis.
Filed June 14, 1972, Ser. No. 262,769
Int. Cl. H01m 1/08
U.S. Cl. 136—176          7 Claims

ABSTRACT OF THE DISCLOSURE

A charged storage battery of the thin walled type is produced by installing assembled battery elements into the container cell compartments, electrically connecting the battery elements, filling the cell compartments with the forming electrolyte, forming the battery elements into a fully charged state, removing about 70 to about 97 weight percent of the forming acid preferably by applying an accelerative force, contacting said formed plates with a determined quantity of oxygen, and installing sealing means to prevent the further ingress of air into the cell compartments. The introduction of the oxygen prevents pressure build-up in the battery and avoids the undesired bulging of the endwalls of the thin walled battery container. In a prefered embodiment, the oxygen is introduced in an accelerated manner by forcing the air into the battery compartment by blowing or the use of compressed air.

CROSS REFERENCE TO RELATED APPLICATIONS (None.)

BACKGROUND TO THE INVENTION

This invention relates to lead acid storage batteries. More particularly, it relates to a proces and apparatus for reducing pressure buildup in lead acid storage batteries which have a minor portion of the forming electrolyte retained after forming and during storage prior to the addition of the electrolyte, which pressure is caused by the retention of the forming acid.

The manufacture of dry charged storage batteries has posed many problems in the battery industry from the standpoint of producing a battery which will maintain a charge after the forming procedure and during storage without the electrolyte. Procedures for drying the battery plates so that the battery does not lose its charge are set forth in U.S. Pats. 1,716,320; 2,880,520 and 3,314,158. All of these prior patents are concerned with the problem of drying the plates between the forming and the reactivation stage when electrolyte is added. In U.S. 1,716,320 the plates are dried by placing them in a closed chamber containing heated air. The oxygen in the air is said to be utilized to form oxides on the plates which, in turn, react with the sulfuric acid to form lead sulfate. The plates are then dried in an inert gas atmosphere by means of the remaining nitrogen. In U.S. 2,880,520 battery plates are also dried in a blast of heated air without harmful oxidation by utilizing high velocity and high temperature air which is controlled within certain definite limits. A nonoxidizing gas system is described in U.S. 3,314,158 wherein hot, dry, nonoxidizing gas at high velocities is caused to be directed into the open top battery assemblies for purposes of drying the battery plates.

A procedure for making a dry charged battery without the drying steps and its inherent problems is described in U.S. 3,652,341 in which one of the co-inventors is also an inventor of that particular process. While the process described in this particular patent has numerous advantages over the prior art methods and also affords a dry charged battery having good low temperature activation performance, an undesirable effect has occurred in that in some instances pressure build-up has been noticed during storage after completion of processing. It has been particularly objectionable in some of the batteries utilizing the thin walled battery containers described in U.S. 3,388,007. This pressure effects a slight bulging of the endwalls, and in some cases causes ejection of the vent seals. It was found that if a controlled amount of oxygen were introduced into the vent ports of the battery, the pressure build-up during subsequent storage could be avoided without an adverse effect on the electrical performance of the battery. This was contrary to teachings of the prior art, which indicates that either oxygen should not be utilized in contact with the formed plates or that if it is utilized, the plates must be dried.

It is an object of the present invention to provide a novel process and apparatus for producing an improved charged storage battery which can be stored without a major portion of the electrolyte. It is another object of this invention to provide a process and apparatus for producing such a storage battery wherein the battery can be stored for prolonged periods of time without internal pressure build-up. It is still another object of this invention to provide a method and apparatus for producing the equivalent of a dry charged battery which method is easily performed and the apparatus fabricated without extensive outlay for equipment. It is yet another object of this invention to afford a process and apparatus for producing such a storage battery without electrolyte which does not require precise controls and is therefore easily adaptable to manufacturing assembly line procedures.

SUMMARY OF THE INVENTION

The foregoing objects are accomplished and the shortcomings of the prior art are overcome by the present process and apparatus wherein the battery element composed of a plurality of positive and negative plates with separators therebetween are installed in a cell compartment and forming electrolyte is added to the compartments. The battery is formed and from about 70 to about 97 weight percent of the forming acid is removed by employing an accelerative force whereafter the plates are contacted with a determined quantity of oxygen which is introduced by means of air. Sealing means are thereafter placed over the battery container to prevent further ingress of air into the cell compartments. Air can be introduced either by permitting ambient air to diffuse into the cells or the process can be accelerated by forcing air into the cell compartments either by blowing the air or the use of compressed air. If the diffusion method is employed, then a period of time of about two to six hours is utilized whereas if the accelerated step of using forced air is employed, then a period of time of one and one half to ten minutes or preferably, five minutes is utilized. As the battery containers will have their covers placed on the containers during the forming step, suitable means are described for introducing air into the individual vent openings to provide controlled oxidation of the formed negative plates. In one embodiment, a plurality of nozzles direct air into the vent openings and in another embodiment, a multiplicity of hoses accomplish this.

BRIEF DESCRIPTION OF THE DRAWINGS

A better understanding of the present process and the apparatus for accomplishing it will be afforded by reference to the drawing wherein:

FIG. 1 is a perspective view of a low pressure air directing system for use in blowing air into individual vents of a storage battery.

FIG. 2 is a perspective view of a high pressure air directing system for introducing air through the vent openings of a storage battery.

DESCRIPTION OF THE PREFERRED EMBODIMENT

The procedure indicated in U.S. Pat. 3,652,341 will be utilized in conjunction with the controlled oxidation step which is to be described herein. Consequently, instead of installing means to seal the battery against the ingress of air into the cell compartments, after the major portion of the forming acid is removed by means of an accelerative force (preferably centrifuging) the plates are subjected to the oxidation treatment as described herein after which they are sealed.

Although not completely understood at this time, it is believed that the build-up of internal pressure in batteries prepared in accordance with Pat. No. 3,652,341 and stored with the cells sealed as mentioned in that patent is caused by a reaction of the dilute sulfuric acid remaining in the cell with the lead of the negative plate through the reaction:

$$Pb + H_2SO_4 \rightarrow PbSO_4 + H_2 \qquad (1)$$

This hypothesis is supported by gas chromatographic analyses which showed up to approximately 30% hydrogen and the balance nitrogen, but essentially no oxygen in the atmosphere of sealed cells that had developed an internal pressure above atmospheric pressure during storage.

It is believed that the process described in this invention minimizes the above reaction to a sufficient extent by causing the following reactions at the negative plate:

$$2Pb + O_2 \rightarrow 2PbO \qquad (2)$$

$$PbO + H_2SO_4 \rightarrow PbSO_4 + H_2O \qquad (3)$$

The quantity of $H_2SO_4$ remaining in the cell has been brought down to a limited amount by an accelerative force as described in U.S. Pat. No. 3,652,341. It is believed that the present invention effectively prevents an undesirable pressure build-up by providing sufficient oxygen to carry out reactions (2) and (3) so as to neutralize this limited amount of sulfuric acid to a degree that reaction (1) is greatly limited. Stoichiometric calculations indicate that the quantity of oxygen present in the cell of the usual commercial sizes of lead-acid batteries is insufficient to carry out reactions (2) and (3) to a sufficient degree to consume the available sulfuric acid.

It is recognized that intentional oxidation of the negative plate consumes some of the stored electrochemical energy and thus is contrary to the basic concept of a dry charge battery in which energy is stored in a chemical state for subsequent release upon activation and discharge.

The following examples are presented to better illustrate the invention and especially to show that the degree of oxidation of the negative plate can be controlled so as to prevent a presure build-up and yet obtain a commercially acceptable discharge capacity upon activation. However, they are not intended to limit the invention to the times, conditions, or materials set forth.

EXAMPLE I

This example illustrates the controlled oxidation of the battery plates which are formed and processed under the general procedures indicated in U.S. 3,652,341 except for the oxidation step which is accomplished in this example by means of permitting air to diffuse into the cell openings.

Several Group 22FC and 24C automotive batteries of, respectively, 50 and 80 ampere hour capacity, with covers and terminal posts installed, were formed in the usual manner utilizing 1.100 specific gravity acid and a current sufficient to bring them to full charge in 20 hours following conventional industry practice. After formation, all the batteries were subjected to a stand time of 24 hours in the forming acid and were then charged with a boost charge of five amps. for two hours after the stand. The electrolyte was then dumped. The 50 ampere hour batteries were then centrifuged at 150 r.p.m. for five minutes with the center of gravity of the battery located approximately 22.5 inches from the center of the centrifuge. Similarily, the 80 ampere hour batteries were centrifuged in a similar manner except that a 200 r.p.m. rate was utilized. The filling ports were left unsealed to permit diffusion of air for periods of one and two hours. The filling ports were then sealed. After such preparation, the batteries were stored at 80° F. and all of them examined after 15 and 30 days. The following Table I shows the results of the tests.

TABLE I

| Oxidation treatment | Battery type in amp hr. | 30° F. activation test | | | Endall condition after storage for— | | | |
| | | | | | 15 days | | 30 days | |
| | | 15 sec. voltage | Time to 7.2 volts | Neg. Cd volts | Pos.* end | Neg.* end | Pos.* end | Neg.* end |
| 2 hr | 50 | 9.24 | 2.97 | .33 | −.240 | −.108 | −.081 | −.080 |
| 2 hr | 50 | 9.24 | 2.97 | .36 | −.090 | −.098 | −.051 | −.041 |
| 1 hr | 80 | 9.15 | 2.70 | .26 | +.034 | +.171 | +.150 | +.20 |
| 2 hr | 80 | 9.32 | 3.10 | .26 | −.125 | −.106 | −.105 | −.065 |
| 2 hr | 80 | 9.29 | 3.10 | .26 | −.082 | −.104 | 0 | −.065 |

*Measurement is in inches with (−) indicating a concave condition and (+) a convex one The date in TABLE 1 indicates all of the batteries subjected to the controlled oxidation treatment of the negative plates have good activation performances (minimum industry requirements being 7.2 volts at 15 seconds) and in the instance of the 80 ampere hour batteries, the treatment period should be more than one hour so as to produce a vacuum indicated by the concave condition of the end walls rather than a pressure shown by convex state of the wall.

Example II

This Example illustrates the effect of sealing various cells immediately after centrifuging utilizing the same general procedure as outlined in Example I during the forming and centrifuging steps except that the forming time is 19 hours and the rest period was 24 hours with the boost charge being five amps. at two hours. Two of the cells were sealed immediately after centrifuging (C1 & C4), two of the other cells were sealed two hours later (C2 & C5); and the remaining two cells were sealed six hours after centrifuging (C3 & C6). The following data illustrates the results of the tests to determine the pressure in the cells for a period of time from 6 hours after processing to 11 days:

TABLE II

| | Internal pressure, p.s.i.g., corrected for barometric pressure changes after sealing | | | | | | |
| Time since processed | Sealed immediate | | 2 hr. delay | | 6 hr. delay | | Ambient temp., °F. |
| | C1 | C4 | C2 | C5 | C3 | C6 | |
| 6 hr | −.19 | −.19 | −.53 | −.68 | Sealed | | |
| 8r hr | −.49 | −.94 | −.78 | −1.33 | −.59 | −.68 | 75 |
| 1 day | −.41 | −1.0 | −1.0 | −1.33 | −1.31 | −1.14 | 73 |
| 2 days | −.14 | −.81 | −.83 | −1.18 | −1.20 | −1.03 | 73 |
| 3 days | 0 | −.68 | −.72 | −.95 | −1.12 | −.97 | 71 |
| 4 days | +.02 | −.56 | −.60 | −.97 | −1.06 | −.95 | 71 |
| 5 days | +.10 | −.31 | −.35 | −.72 | −.83 | −.80 | 74 |
| 6 days | +.25 | −.23 | −.21 | −.62 | −.74 | −.72 | 74 |
| 7 days | +.37 | −.06 | −.12 | −.46 | −.71 | −.70 | 75 |
| 8 days | +.41 | +.08 | +.04 | −.29 | −.54 | −.54 | 79 |
| 9 days | +.39 | +.04 | −.06 | −.46 | −.68 | −.68 | 72 |
| 11 days | +.52 | +.15 | +.02 | −.33 | −.58 | −.58 | 72 |

Analysis of the data shows that for the first five days the rate of pressure increase was greatest for the "sealed immediate" batteries and was less for the two hour period and least for the six hours. After seven days, the pressures level out with a pressure in the "sealed immediate" and a vacuum in the six-hour delay batteries with the two-hour delay being located in between.

Example III

This Example illustrates the utilization of low pressure air being blown into the batteries for periods of 2½ minutes, five minutes, and ten minutes utilizing 50 and 80 ampere hour batteries formed and centrifuged in the same manner described in Example I. The apparatus which has been found most effective for accomplishing the introduction of the air by being blown into the open cell vents is illustrated in FIG. 1 of the drawing and will be described hereafter. The flow rate of the air is 1.1 standard cubic feet per minute per each hose 16 at a pressure of 12 inches water column. Four similar batteries were prepared at each set of conditions. Two were then activated and subjected to the 30° F. activation test. Two were stored at 80° F. and examined at 15 and 30 days. The following table illustrates the results of the tests for the various time periods:

Example IV

This Example illustrates the controlled oxidation of batteries processed in accordance with the procedure in Example I except that instead of utilizing air diffusion or low pressure air as in Example III, a high pressure system is utilized wherein the open vents are subjected to successive blasts of air as they pass continuously under a row of nozzles. It is preferred to use a nozzle which produces a flat spray pattern, with the long axis of the pattern perpendicular to the direction of movement of the battery. In this Example the nozzle used was Spraying Systems Co., Bellwood, Ill. nozzle number ¼ TTP, with a spray angle of 80° at 50 p.s.i.g. and a capacity of 3.1 s.c.f.m. at 50 p.s.i.g.

The apparatus illustrated in FIG. 2 is utilized in this particular procedure except in some instances double rowed nozzles 35 were employed. A variety of conditions have been found effective. In all of the oxidation treatments except E & I, a conveyor speed of 16 feet per minute was used. For E & I treatments the conveyor speed was 4 feet per minute. Two rows of 13 nozzles were employed for A while D & G had single 13 nozzle rows. All of the remaining treatments utilized 26 nozzle rows except C which had two rows of 7 nozzles. As to the amount of

TABLE III

| Oxidation treatment (min.) | Battery type in amp. hr. | 30° F. activation test | | | Endwall condition after storage for— | | | |
|---|---|---|---|---|---|---|---|---|
| | | | | | 15 days | | 30 days | |
| | | 15 sec. voltage | Time to 7.2 volts | Neg. Cd. volts | Pos.* end | Neg.* end | Pos.* end | Neg.* end |
| 2½ | 50 | 9.35 | 2.75 | .36 | −.118 | −.082 | −.062 | −.069 |
| 2½ | 50 | 9.54 | 3.05 | .33 | −.048 | −.125 | −.049 | −.103 |
| 5 | 50 | 9.40 | 2.73 | .39 | −.162 | −.184 | −.192 | −.159 |
| 5 | 50 | 9.45 | 2.77 | .48 | −.214 | −.180 | −.215 | −.171 |
| 10 | 50 | 9.35 | 2.92 | .42 | −.161 | −.210 | −.084 | −.20 |
| 10 | 50 | 9.35 | 3.00 | .42 | −.204 | −.232 | −.122 | −.236 |
| 2½ | 80 | 9.40 | 3.20 | .20 | −.123 | −.093 | −.032 | −.011 |
| 2½ | 80 | 9.10 | 3.80 | .30 | −.93 | −.093 | 0 | −.007 |
| 5 | 80 | 9.02 | 3.20 | .33 | −.027 | −.055 | +.040 | 0 |
| 5 | 80 | 9.41 | 3.20 | .26 | −.059 | −.036 | 0 | +.05 |
| 10 | 80 | 8.98 | 2.60 | .33 | −.031 | −.100 | 0 | −.022 |
| 10 | 80 | 8.94 | 3.20 | .26 | −.134 | −.144 | −.100 | −.062 |

*Measurement is in inches with (−) indicating a concave condition and (+) a convex one.

The above tests show that the desired slight vacuum is in almost all instances produced when utilizing either the 2½ minute, five minute, or ten minute blowing time period.

air passing through each nozzle, treatments A, B and D had 2.2 standard cubic feet per minute; for C it was 3.1; E was 4; F had 2.3; G was 3.3 and H, 3.6. The results are shown in Table IV.

TABLE IV

| Oxidation treatment (min.) | Battery type in amp. hr. | 30° F. activation test | | | Endwall condition after storage for— | | | |
|---|---|---|---|---|---|---|---|---|
| | | | | | 15 days | | 30 days | |
| | | 15 sec. voltage | Time to 7.2 volts | Neg. Cd. volts | Pos.* end | Neg.* end | Pos.* end | Neg.* end |
| A | 50 | 9.32 | 2.92 | .33 | −.023 | −.002 | −.027 | +.063 |
| A | 50 | 9.31 | 3.20 | .33 | −.029 | −.014 | −.038 | −.010 |
| B | 50 | 9.34 | 2.96 | .42 | −.041 | −.028 | 0 | 0 |
| B | 50 | 9.42 | 2.90 | .39 | −.026 | −.016 | −.005 | −.005 |
| C | 50 | 9.51 | 3.12 | .36 | .000 | −.001 | −.010 | +.112 |
| C | 50 | 9.32 | 2.95 | .33 | +.154 | +.048 | +.158 | +.125 |
| D | 50 | 9.33 | 3.05 | .33 | −.012 | −.026 | −.020 | −.004 |
| D | 50 | 9.45 | 2.93 | .36 | −.032 | −.043 | −.026 | −.010 |
| E | 50 | 9.26 | 3.00 | .42 | −.161 | −.204 | −.090 | −.102 |
| E | 50 | 9.27 | 2.95 | .38 | −.178 | −.200 | −.085 | −.100 |
| F | 80 | 9.35 | 2.9 | .30 | 0 | +.055 | +.116 | +.174 |
| F | 80 | 9.33 | 2.9 | .30 | +.015 | +.060 | +.192 | +.185 |
| G | 80 | 9.26 | 2.8 | .26 | 0 | +.096 | +.169 | +.193 |
| G | 80 | 9.24 | 2.9 | .30 | +.053 | +.040 | +.123 | +.150 |
| H | 80 | 9.33 | 3.1 | .30 | +.016 | +.038 | +.058 | +.075 |
| H | 80 | 9.36 | 3.2 | .26 | 0 | +.036 | +.021 | +.042 |
| I | 70 | 9.34 | 3.1 | .32 | −.075 | −.093 | −.057 | −.046 |
| I | 70 | 9.30 | 2.9 | .30 | −.092 | −.072 | −.060 | −.050 |

*See Table III for footnote.

From the data in Table IV, it can be seen that the larger size elements with plates require more oxidation treatment. Based on the data it was found that for the 22FC group 50 ampere hour batteries that the air flow per nozzle could range from 2.2–4.0 standard cubic feet per minute while for the 80 ampere hour group 24C units, it would preferably be 3.5–4.0 s.c.f.m. A minimum of 3.5 s.c.f.m. is used for the 70 ampere hour 24C batteries. In all instances the minimum number of nozzles was found to be 13 for the 50 amp. batteries whereas for the 70 and 80 amp. units, it was 26 when employing a minimum conveyor speed of 4 feet per minute and the previously described air flow. For the 50 amp. units a conveyor speed of 16 feet per minute was found to be acceptable.

An apparatus which can be advantageously employed for directing low pressure air into a lead acid storage battery is shown in FIG. 1. The low pressure apparatus generally 10 has an electrical motor 11 for driving a blower 12, the blower being in communication with a substantially airtight plenum 14. A plurality of small rod-like nozzles 15 project from a vertical wall surface 13 and are in communication with the inside of plenum 14. Although all of the nozzles 15 do not have flexible hoses 16 extending from them, in actual use they would and would be of a length to extend into the cell vent openings 18 of a typical lead acid storage battery 20 which would be moved adjacent the plenum 14 by means of a conveyor 21. It will be noted that the hoses are disposed in gangs of three by means of platelike gang members 23 so as to provide ease of placing the hoses in the respective vents 18 and to do so in a single motion without handling each hose individually. Under assembly line conditions, the battery 20 will be transferred from the previously described centrifuging step and when positioned adjacent the hoses 16, the conveyor will be stopped whereupon the hoses will be introduced into the vents 18 and the low pressure air will be introduced through each hose at approximately 1.1 standard cubic feet per minute at a pressure of 12 inches of water. The hoses in this instance are ⅜ inch outside diameter with an approximate $\frac{3}{16}$ inch inside diameter, and the plenum is designed with a sufficient number of nozzles 15 and hoses 16 to process twenty batteries at one time.

FIG. 2 illustrates an apparatus for accomplishing the same function as described for low presure air system 10 except that this particular apparatus utilizes compressed air from a source (not shown) and at a pressure of 76 p.s.i. In this particular mechanism the batteries 20 will be moved in a continuous manner by means of conveyor belt 31 with guide rails 32 orienting batteries 20 with their open vents 33 below nozzles 35. Tubular conduit manifold 37 is centrally supported above the conveyor by adjustable crossarm 40 supported by height adjusting slots 42 in support arms 43. Compressed air is delivered to tubular manifold 37 from a compressed air source, with the air being directed through a filter 45 and controlled by a solenoid valve 46 and a regulator 47. As indicated in Example IV, twenty six nozzles 35 are preferably disposed along tubular manifold 37 and with the 76 p.s.i. air being delivered to the manifold 37 at 70 p.s.i. Manifold 37 is a 78 inch length of polyvinyl chloride pipe and nozzles 35 are spaced along manifold 37 at 3 inch centers. Heights of nozzles 35 as measured from the top of batteries 20 were found to be satisfactory from .50 inch to .72 inch. Approximately 8 feet of conveyor belt 31 will be required at the station comprising the high pressure apparatus 30. Conveyor belt 31 will be moved at a rate of about 4 feet per minute.

As indicated in Example IV, two rows of nozzles 35 have been utilized and were connected to a single tubular manifold 37. However, with a wide spray type nozzle such as the Spraying Systems Co. ¼ TTP type indicated in Example IV sufficient air will be blown into the vent openings 33 which are linearly aligned.

The preferred operating conditions indicated previously for low pressure delivery system 10 is preferably indicated for a five minute time period whereas for the high pressure system 30 it is approximately 1½ minutes. This sequence works well in conjunction with the centrifuging to remove a substantial quantity of the electrolyte which usually takes a period of approximately five minutes. If this period of time is varied, then the conditions of operations of the two apparatus can be varied to accommodate either a faster or shorter sequence with appropriate adjustment for the air flow within the indicated limits. Irrespective of the apparatus used or whether the air is allowed to diffuse into the individual cells, the amount of oxygen delivered to each cell should be that amount sufficient to cause neutralization of a substantial portion of the acid residual in the battery by reaction with the lead oxide resulting from reaction of the oxygen in said air with the electromechanically active material of the negative plate. This will retard the undesired reaction with the acid electrolyte to form hydrogen gas and will not substantially limit the electrical capacity of the plate. This amount can be easily determined by the tests set forth in the Examples and particularly the 30° F. activation tests.

It will thus be seen that through the present invention and quite beyond the teachings of the prior art, that internal pressures in lead acid storage batteries wherein a minor portion of the forming acid is left to remain during storage can be reduced and in some instances eliminated by subjecting the plates to a controlled oxidation treatment. The method requires a minimal amount of time and the apparatus for conducting it does not require extensive fabrication. The method results in a battery having good storage characteristics with high performance yet eliminates the conventional drying steps previously thought necessary when making dry charged batteries. The method and the apparatus is adaptable to providing the controlled amount of oxygen necessary yet does not require strict controls so that it can be operated without extensive control procedures.

The foregoing invention can now be practiced by those skilled in the art. Such skilled persons will know that the invention is not necessarily restricted to the particular embodiments herein. The scope of the invention is to be defined by the terms of the following claims as given meaning by the preceding description.

What is claimed is:

1. A method of reducing pressure build-up in a fully charged battery capable of being activated by the addition of electrolyte which comprises a container having at least one cell compartment and at least one battery element composed of a plurality of positive and negative plates with separators disposed therebetween comprising installing said battery elements into said cell compartment, adding forming acid electrolyte to said cell compartment, forming said battery element, removing from about 70 to about 97 weight percent of said forming electrolyte based on the total weight of the forming electrolyte in said battery after completion of the forming step, contacting said plates with a determined quantity of oxygen by forcing air into said cell compartment to cause said oxygen to react with the active material of the negative plate in an amount sufficient to cause neutralization of a substantial portion of the forming acid electrolyte and installing sealing means into said battery to prevent the further ingress of air into said cell compartment.

2. The method as defined in claim 1 wherein said air is forced into said cell compartment for a period of time of about five minutes.

3. The method as defined in claim 1 wherein said air is forced into said compartment by blowing.

4. The method as defined in claim 3 wherein the source of said blown air is compressed air.

5. The method as defined in claim 4 wherein said air is forced into said cell compartment for a period of time of about one and one-half minutes.

6. The method as defined in claim 1 wherein said air is forced into said cell compartment over a period of time of about one and one-half to about ten minutes.

7. The method as defined in claim 1 wherein said forming electrolyte is removed by means of centrifugal force and said air is forced into said cell compartment through the vent openings.

References Cited
UNITED STATES PATENTS

| | | | |
|---|---|---|---|
| 3,652,341 | 3/1972 | Halsall et al. | 136—176 |
| 1,716,320 | 6/1929 | Pearson | 136—33 |
| 1,478,708 | 12/1923 | Gasche | 136—33 |
| 1,816,035 | 4/1928 | Woodbridge | 136—176 |
| 2,880,520 | 4/1959 | Ellis et al. | 34—29 |
| 3,314,158 | 4/1967 | Caeson et al. | 34—21 |

DONALD L. WALTON, Primary Examiner

U.S. Cl. X.R.

136—33

UNITED STATES PATENT OFFICE
CERTIFICATE OF CORRECTION

Patent No. 3,846,180          Dated November 5, 1974

Inventor(s) Warren Ladd Towle & Edward Norman Mrotek

It is certified that error appears in the above-identified patent and that said Letters Patent are hereby corrected as shown below:

Column 1, line 35 - "BACKGROUND TO THE INVENTION" should read --BACKGROUND OF THE INVENTION--

Column 1, line 38 - "proces" should read --process--

Column 3, line 6 - "procedure" should read --procedures--

Column 4, Table I - the heading "Endall condition after storage for" should read --Endwall condition after storage for--

Column 4, Table II - in the column "Time since processed" the figure "8r hr" should read --8 hr--

Column 5, Table III - In the column "15 sec. voltage" the figure "9.35" (second occurrence) should read --9.39--

Column 5, Table III - In the column "15 days - Pros.*end" the figure "-.93" should read -- -.093--

Column 8, lines 17 & 18 - "electromechanically" should read --electrochemically--.

Signed and sealed this 4th day of March 1975.

(SEAL)
Attest:

RUTH C. MASON
Attesting Officer

C. MARSHALL DANN
Commissioner of Patents
and Trademarks